June 3, 1930.    H. A. SCHWAGER    1,761,538
THROTTLE OPERATED SPARK CONTROL
Filed June 1, 1928    2 Sheets-Sheet 1

Inventor
Henry A. Schwager
by Spencer Hardman & Fehr
his Attorneys

Patented June 3, 1930

1,761,538

UNITED STATES PATENT OFFICE

HENRY A. SCHWAGER, OF DETROIT, MICHIGAN, ASSIGNOR TO GENERAL MOTORS CORPORATION, OF DETROIT, MICHIGAN, A CORPORATION OF DELAWARE

THROTTLE-OPERATED SPARK CONTROL

Application filed June 1, 1928. Serial No. 282,223.

This invention relates to ignition apparatus for internal combustion engines, and particularly to the control of ignition timing in accordance with engine operating conditions. One of the objects of the present invention is to so control the timing of the ignition that the spark will be advanced during movement of the engine throttle from closed to partly open position and so that the spark will be retarded upon further movement of the throttle into wide open position.

A further object of this invention is to control the timing of the ignition in response to engine speed and also in response to engine throttle position in such manner that, during movement of the throttle from closed to partly open position, the timing of the ignition will be advanced, but will be retarded during further movement of the throttle into wide open position. In this connection, it is an object of the invention to provide independently operable devices for controlling the ignition timing in response to engine speed and engine throttle position respectively so that the timing of the ignition will be the resultant of the combined effects produced by means responsive to engine speed and means responsive to throttle position.

Further objects and advantages of the present invention will be apparent from the following description, reference being had to the accompanying drawings, wherein a preferred form of embodiment of the present invention is clearly shown.

Figure 1:
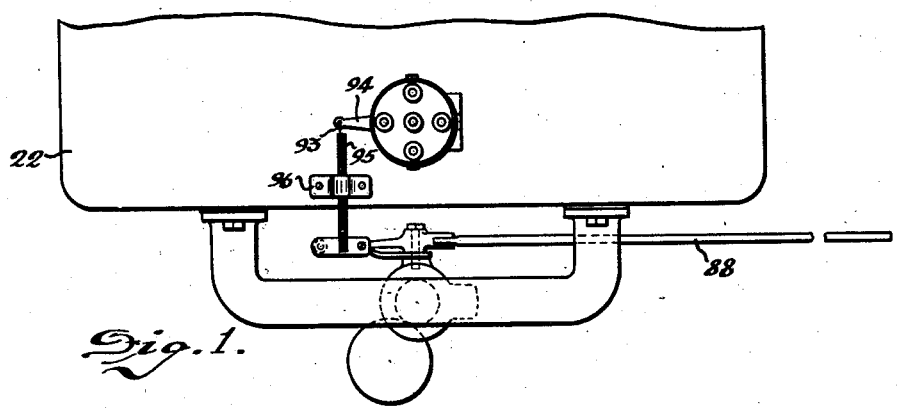
Figs. 1 and 2 are fragmentary plan and side elevation respectively of an internal combustion engine, provided with ignition apparatus embodying the present invention.

Referring to Figs. 5, 6, and 7, 20 designates the ignition timer housing or cup having a shank 21 which is rotatably supported by the engine frame 22 in the usual manner and which provides a bearing 23 for an engine driven shaft 24. The shaft 24 is drivingly connected with weight plate 25 carrying weight studs 26, each supporting a weight 27, each weight 27 including a lever arm 28 cooperating with a lever arm 29 attached to a sleeve. The sleeve 30 is rotatable loosely about an extension 31 of the shaft 24 and provides an ignition interrupter cam 32 and a mounting portion 33 for a distributor rotor block 34 which is drivingly connected with the sleeve 30. Each lever arm 29 is provided with a spring stud 35 connected with an adjacent weight stud 26 by spring 36. The springs 36 will operate to maintain the lever arms 28 in engagement with the arms 29 and, thus, will urge the arms 29 in a counter-clockwise direction about the shaft extension 31 and move the weights 27 inwardly toward the shaft extension 31 as viewed in Fig. 7.

The circuit interrupter comprises contacts 40 and 41 attached respectively to circuit breaker lever 42 and the contact bracket 43. Lever 42 and bracket 43 are concentrically pivoted upon a stud 44 attached to a circuit breaker plate 45 having ears 46 for receiving screws 47 by which the plate 45 is attached to the housing 20. The lever 42 is insulated from the stud 44 by non-conducting bushing 48. The housing 20 insulatingly supports a terminal 50 which is electrically connected with the lever 42 by a leaf-spring conductor 51 carrying at one end a stud 52 urged by the spring into contact with the terminal 50; and the other end of the spring 51 is attached to the lever 42 by a rivet 53 which also secures to said lever an L-shaped rubbing block 54 which cooperates with the cam 32.

The distributor rotor block 34 supports a distributing segment which rotates past distributor posts 61 integral with terminal receiving sockets 62 embedded in the distributor head 63. The block 34 also supports a center button 64 electrically connected with the segment 60 by leaf-spring conductor 65 which serves to press the button 64 against the contact block 66 electrically connected with the terminal receiving socket 67.

The speed responsive means which controls the timing of the ignition is provided by the centrifugal device which connects the shaft 24 with the cam 32. In the particular form of invention in the drawing the direction of rotation of the cam 32 is clockwise or as indicated by the arrow in Fig. 6. It is apparent that as the speed of the shaft 24 increases the weights 27 will rotate about the plug 26 in a counter-clockwise direction, and therefore, will rotate the cam 32 in the direction of the arrow 70 relative to the shaft extension 31. Consequently as the speed of the shaft 24 decreases the centrifugal force acting on the weights 27 will diminish and permit the springs to move the weights 27 toward the shaft extension 31 and to rotate the cam 32 counterclockwise relative to the shaft extension 31.

The means responsive to throttle position for controlling the ignition circuit interrupter comprises a cam lever 80 (see Figs. 1 to 4) which is connected with a shaft 81 supported by the engine carburetor 82. The engine fuel passage to the carburetor is designated by numeral 83 in Fig. 3 and is controlled by a butterfly throttle valve 84. The throttle 84 is operated by pedal 85 connected by bell crank lever 86 pivoted at 87 with a rod 88 which connects the lever 86 with the cam lever 80. The lever 80 cooperates with a cam follower or roller 89 attached to lever 90 pivoted upon a stud 91 attached to a bracket 92 which is preferably mounted upon the carburetor 82. The lever 90 is attached by a Bowden wire 93 to a lever 94 which is clamped to the shank 21 in the housing 20. The Bowden wire 93 passes through a Bowden wire tube 95 which is attached by a clip 96 to the engine frame 22 and also attached to the bracket 92 at its end adjacent the lever 90. The bracket 92 carries a plate 100 to which is attached a spring 101 connected with the lever 90 and tending to move the lever 90 in such direction as to retard the spark, and tending to maintain the roller 89 in engagement with the cam lever 80.

The timing of the ignition is controlled in response to the operation of the throttle valve 84 in the following manner: The throttle 84 is operated by pressing the pedal 85 which causes the bell crank lever 86 to move in a counterclockwise direction and the cam lever 80 in a clockwise direction. During a portion of the movement of the valve 84 from closed toward open position, the roller 89 is engaged by the cam surface 80$^a$ which is so shaped as to lift the roller 89 and cause the lever 90 to move in a counterclockwise direction. Motion is transmitted from the lever 90 to the lever 94 by the Bowden wire 93 so that the timer housing 20 will be rotated in a counterclockwise direction as viewed in Fig. 6 in order to advance the timing of the ignition. The ignition timing continues to be advanced as the throttle valve 84 is opened until a certain open position of the throttle has been reached beyond which it is not desirable to advance the timing of the ignition in response to further openings of the throttle. When this predetermined position of the throttle has been reached, the peak-ridge portion 80$^b$ of the cam 80 will be directly under the roller 89. Further movement of the throttle 84 toward open position is produced by further movement of the lever 80 in a clockwise direction. During this further movement the cam surface 80$^c$ of the lever 80 will engage the roller 89; and, as the lever 80 moves clockwise the lever 90 will move clockwise under the action of the spring 101. Clockwise movement of the lever 90 is transmitted through the Bowden wire 92 to the lever 94 in order to cause the ignition timer housing 20 to move in a clockwise direction to retard the timing of the ignition.

Figure 2:
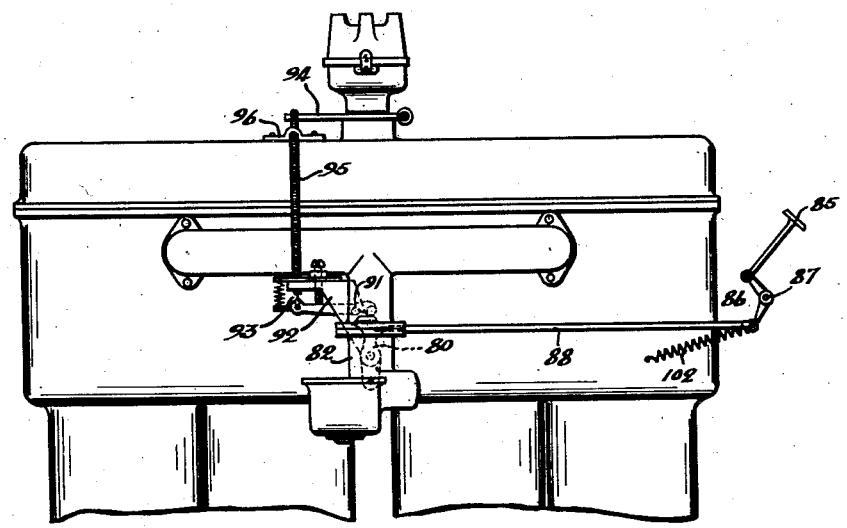
Figure 3:
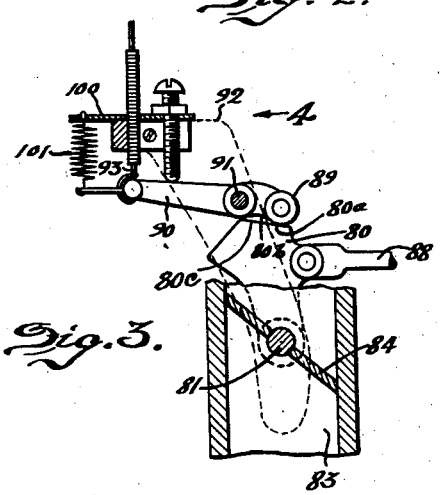
Fig. 3 is a fragmentary side view partly in section showing a portion of the mechanism for controlling the ignition in response to throttle position.
Figure 4:
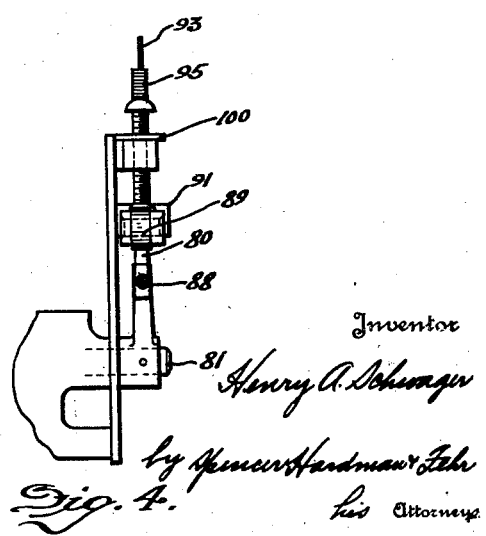
Fig. 4 is a fragmentary view looking in the direction of the arrow 4 in Fig. 3.
Figure 6:
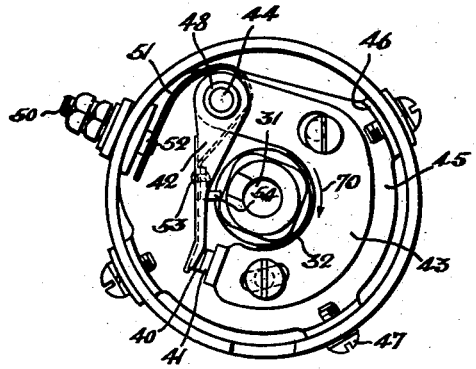
Fig. 6 is a plan view of the timer-distributor with a distributor cap and distributor rotor removed.
Figure 7:
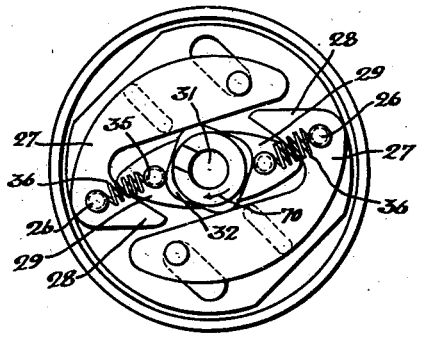
Fig. 7 is a plan view of the timer-distributor with the distributor head, rotor, and breaker-plate assembly removed.
Figure 5:
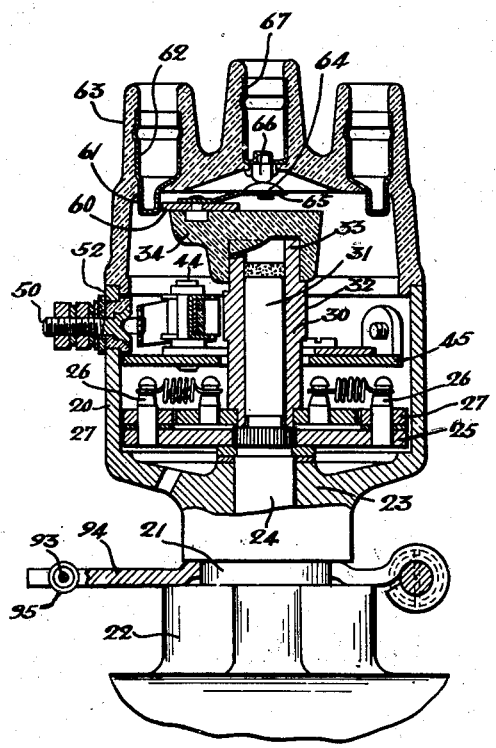
Fig. 5 is a vertical sectional view of an ignition timer-distributor included in the present invention.

When pressure upon the pedal 85 is released a spring 102 is permitted to move the pedal 85 upwardly and the rod 88 toward the left as viewed in Fig. 2 in order to move the valve 84 in a counterclockwise direction toward closed position. As the valve 84 moves from wide open to closed position the ignition timing will first be advanced and then retarded.

Figure 8:
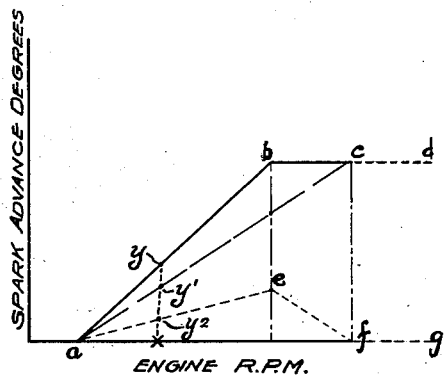
Fig. 8 is a diagram showing the relation between spark advance and engine speed.

It will be noticed that the device which controls the timing of the ignition in response to throttle position operates independently of the speed-responsive device for controlling the timing of the ignition. Both devices may operate cumulatively or differentially depending on certain conditions which can best be described with reference to the diagram as shown in Fig. 8. In Fig. 8 the ordinates represent the degrees of spark advance from position of maximum retard and the abscissæ represent engine speed. The distance from the line b—c—d to the base line a—g represents the degrees of maximum spark advance permissible for some particular engine as determined experimentally. Assume that it has been found experimentally that for normal part load operating conditions the ignition timing should be as represented by the line a—b—c showing that the spark should be steadily advanced until a certain engine speed has been obtained and thereafter substantially no further advance is required. The speed responsive device is constructed so as to control the timing of the ignition in a manner represented by the line a—c and the device responsive to throttle position is constructed so as to control the timing of the ignition as represented by the line $a$—$e$—$f$. Thus, the line $a$—$b$—$c$ is the algebraic result of the two spark controls represented by the lines $a$—$c$ and $a$—$e$—$f$. The engine speed at $b$ or $e$ is that speed which is obtainable under normal part load conditions when the throttle is in such position that the cam portion $80^b$ is directly under the roller 89. From Fig. 8 it is apparent that as the throttle 84 is opened to produce an engine speed of $b$ or $e$ R. P. M. the amount of spark advance will be due to the combined effects of the speed responsive device and the device which is responsive to the throttle position. Between zero and $b$ R. P. M. the spark is advanced at a greater rate than would be obtainable with the speed responsive device alone. This effect is desirable since it has been found that under normal part load conditions the spark can be advanced relatively rapidly up to a certain engine speed and beyond that speed little, if any, spark advance is required. Therefore, the line $b$—$c$ representing the differential effect produced by the two spark controlling devices, when the throttle valve is opened wider to produce speed in excess of the speed $d$ or $e$, is substantially a horizontal line denoting substantially no advance in the timing beyond the speed $b$.

In order to illustrate how the timing of the ignition is controlled when the engine is required to carry a load greater than normal, assume that the engine is being operated at $x$ R. P. M. then the spark advance will be represented by the point $y$ under normal operation conditions. The degree of spark advance $y$ being the sum of the degrees produced by the centrifugal device and represented by the point $y^1$ and the degrees produced by the device responsive to throttle position and represented by the point $y^2$. If the engine load is such as to require full opening of the throttle in order to maintain an engine speed of $x$ R. P. M. then all the effect of the throttle responsive device to advance the spark will be eliminated and the amount of advance will be only that produced by the centrifugal device and will be represented by the point $y^1$.

It will be understood that the present invention is not limited to the use of ignition timing controlling devices which operate exactly according to the diagram shown in Fig. 8. The law of spark advance, as represented by the slope of the lines of $a$—$c$ and $a$—$e$ and $e$—$f$, will need to be determined by the type of engine and its operating conditions.

While the form of embodiment of the present invention as herein disclosed, constitutes a preferred form, it is to be understood that other forms might be adopted, all coming within the scope of the claims which follow.

What is claimed is as follows:

1. Ignition apparatus for internal combustion engines comprising, a circuit interrupter including a breaker lever and an engine driven cam, speed responsive means for varying the time relation of the cam to the engine in order to advance the timing of the ignition as the speed increases, and means responsive to engine throttle position for varying the position of the breaker lever relative to the cam and comprising, an intake manifold having a rotatable throttle valve, a shaft for operating said valve, a cam connected to the shaft, a bracket secured to the manifold adjacent said shaft, a cam follower supported by said bracket in cooperative relation with said cam, and a Bowden wire connecting said follower and circuit interrupter so that, during movement of the engine throttle from closed to partly-open position, the ignition timing will be advanced and thereafter be retarded as the throttle is opened still wider.

2. The combination with an internal combustion engine having a rotatable throttle valve and a shaft for operating it, of an engine operated circuit interrupter and means for controlling the circuit interrupter in response to throttle positions and comprising a cam connected with the throttle shaft, a bracket secured adjacent said shaft and providing a cam follower associated with the cam, a Bowden wire operatively connecting said follower and circuit interrupter for so varying the time relation between the engine cycle and the interrupter cycle, that ignition timing will be advanced during movement of the engine throttle from closed to partly-open position, and the ignition timing will be retarded during further movement of the throttle to full-open position.

3. Ignition apparatus for internal combustion engines comprising, a circuit interrupter including a breaker lever and an engine driven cam, speed responsive means for varying the time relation of the cam to the engine in order to advance the timing of the ignition as the speed increases, and means responsive to engine throttle position for varying the position of the breaker lever relative to the cam, said throttle position responsive means comprising, an intake manifold providing a fuel passage with a throttle valve, and a cam member secured thereto, a bracket secured to said manifold and supporting a cam follower in coactive relation with said throttle cam, and a Bowden wire operatively connecting said cam follower and circuit interrupter so that, during movement of the engine throttle from closed to partly-open position, the ignition timing will be advanced and thereafter be retarded as the throttle is opened still wider.

In testimony whereof I hereto affix my signature.

HENRY A. SCHWAGER.